(12) United States Patent
Lopez et al.

(10) Patent No.: US 12,705,499 B1
(45) Date of Patent: Aug. 11, 2026

(54) ENDPOINT DEVICE PEER ECOSYSTEM FOR FEDERATED LEARNING

(71) Applicant: UIPCO, LLC, San Antonio, TX (US)

(72) Inventors: Mark Anthony Lopez, Helotes, TX (US); Dustin Bowen Bitter, Lehi, UT (US); Rouben Sagatelov, Highland Heights, OH (US); Megan Sarah Jennings, San Antonio, TX (US); David Michael Schlittler, San Antonio, TX (US); Ric M. Pena, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 698 days.

(21) Appl. No.: 18/295,023

(22) Filed: Apr. 3, 2023

(51) Int. Cl.

| | |
|---|---|
| ***G06N 3/098*** | (2023.01) |
| ***G06N 3/0464*** | (2023.01) |
| ***G06N 3/09*** | (2023.01) |

(52) U.S. Cl.
CPC .......... *G06N 3/098* (2023.01); *G06N 3/0464* (2023.01); *G06N 3/09* (2023.01)

(58) Field of Classification Search
CPC ......... G06N 3/098; G06N 3/0464; G06N 3/09
See application file for complete search history.

(56) References Cited

U.S. PATENT DOCUMENTS

| | | | | |
|---|---|---|---|---|
| 11,836,643 | B2 * | 12/2023 | Sharad | G06F 21/606 |
| 2020/0285980 | A1 * | 9/2020 | Sharad | G06N 3/098 |
| 2021/0073639 | A1 * | 3/2021 | Jakkam Reddi | G06N 20/20 |
| 2024/0086720 | A1 * | 3/2024 | Li | G06N 3/084 |

FOREIGN PATENT DOCUMENTS

| | | | | |
|---|---|---|---|---|
| CN | 11409166 | A * | 11/2021 | G06N 3/08 |

OTHER PUBLICATIONS

Efficient Learning Deep Networks from Decentralized Data (Year: 2017).*

* cited by examiner

*Primary Examiner* — Aftab N. Khan
(74) *Attorney, Agent, or Firm* — Potomac Law Group, PLLC; Dannon G. Allbee

(57) ABSTRACT

Aspects of the present disclosure relate to an endpoint device peer ecosystem for federated learning. Lower capability endpoint devices within the peer ecosystem (e.g., within a networked household or office) can collect data, such as user data, usage data, environmental data, etc., while being in communication with a local central device (e.g., a laptop). The local central device can receive a trained machine learning model from a remote computing system, and can either A) receive data collected by the lower capability endpoint devices, aggregate it, and retrain the model, or B) provide the model to the lower capability endpoint devices that individually retrain the model, with the local central device aggregating the retrained models. The local central device can then send the retrained and/or aggregated model back to the remote computing system, without exposing the data collected by the peer ecosystem.

20 Claims, 10 Drawing Sheets

ENDPOINT DEVICE PEER ECOSYSTEM FOR FEDERATED LEARNING

TECHNICAL FIELD

The present disclosure is directed to an endpoint device peer ecosystem, such as an Internet-of-Things (IoT) peer ecosystem, for federated learning.

BACKGROUND

Federated learning has become an increasingly popular method of machine learning, in which a central model is located on a remote server. The remote server can send instances of the central model to client devices, with the client devices at least partially training the instances using locally stored or collected data. The client devices can send the partially trained models back to the remote server, who can combine the instances (e.g., by aggregating node weights of the machine learning model), to produce an overall trained model, without exposing potentially sensitive or identifying user data.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
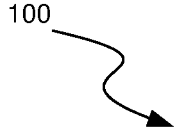
FIG. 1 is a block diagram illustrating an overview of devices on which some implementations can operate.
Figure 1:
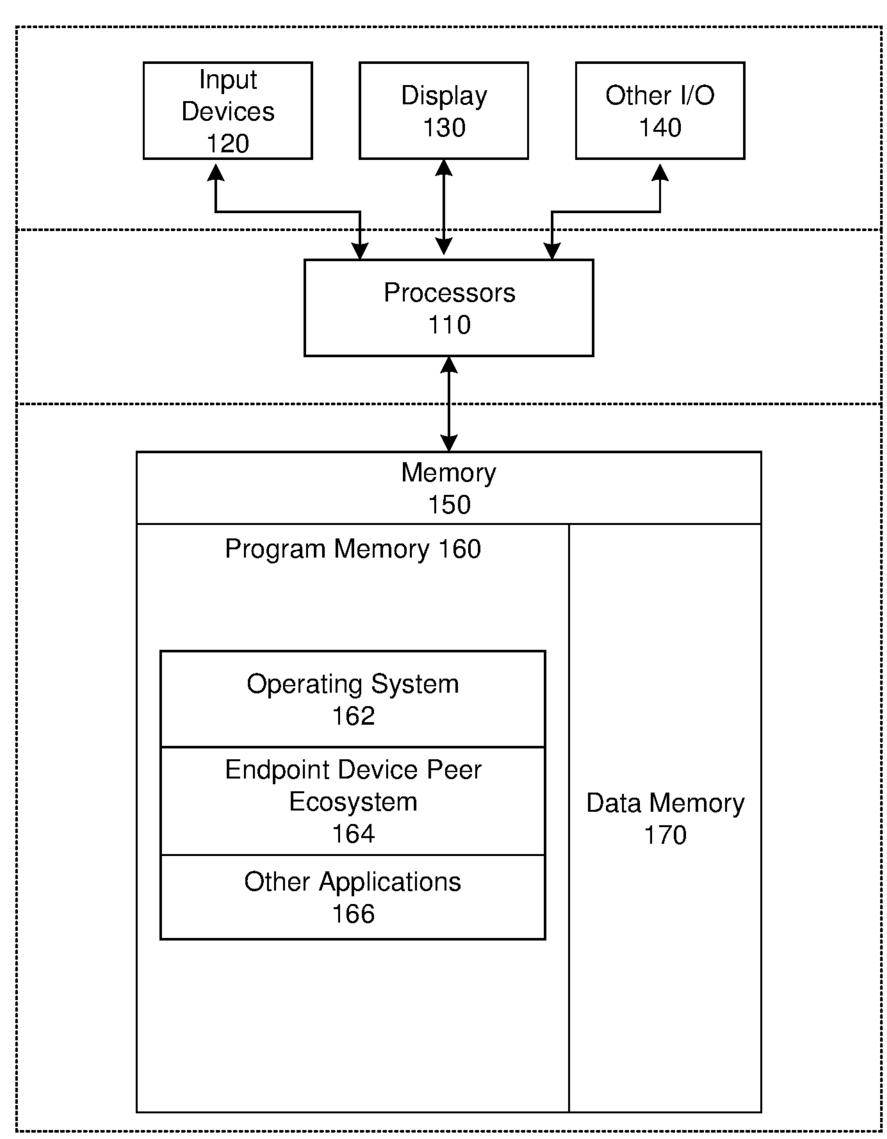

Aspects of the present disclosure relate to an endpoint device peer ecosystem for federated learning. Lower capability endpoint devices (e.g., with less capability such as processing power, memory, heat requirements, energy consumption, etc., than a server or data center) within the peer ecosystem (e.g., within a networked household, office, or organization) can collect data, such as user data, usage data, environmental data, etc., while being in communication with a local central device (e.g., a laptop). The local central device can receive a trained machine learning model from a remote computing system and can either A) receive data collected by the lower capability endpoint devices, aggregate it, and retrain the model, or B) provide the model to the lower capability endpoint devices that individually retrain the model, with the local central device aggregating the retrained models. The local central device can then send the retrained and/or aggregated model back to the remote computing system, without exposing the data collected by the peer ecosystem.

For example, a laptop computer within a household can obtain a master machine learning model from a central computing system (e.g., a remote server associated with a company producing Internet-of-Things (IoT) devices). In some implementations, the master machine learning model can be trained to predict user behaviors with respect to IoT devices within households in general, based on datasets and/or model weights provided by many households. In some implementations, the master machine learning model can be trained to predict user behaviors with respect to IoT devices in specific types of households, such as households in a particular geographic location, households having certain demographics, households having a certain number of people, etc.

In some implementations, the laptop computer can share the master machine learning model with a number of networked IoT devices within the household, such as smart bulbs, smart thermostats, smart speakers, smart televisions, smart plugs, etc. For example, the master machine learning model can predict A) when to activate, dim, brighten, and deactivate smart bulbs installed at certain locations; B) when to adjust a smart thermostat based on time of year or time of day; C) when and what kind of data to provide users within the household, and/or in what rooms to announce the data, via smart speakers employing an artificial intelligence (AI) virtual assistant; D) when to turn a smart television on and off and in which rooms (e.g., turn the TV off by 9 PM for a teenager's room); E) when to tune to a particular channel or program on a smart television; and/or the like. In other implementations, the local device can gather other information such as user movement data, activities, language, etc. which can be aggregated and used to train part of a model locally, whether or not used in conjunctions with an IoT system.

In some implementations, the local devices can implement such predictions, and receive explicit or implicit feedback about the predictions (e.g., a user turning a light off after it has been turned on, a user telling a virtual assistant to stop playing music, etc.). In some implementations, the local devices can provide updated model data to the laptop, either as raw feedback data, as a set of adjusted weights or other parameters applied to nodes of the master machine learning model, and/or as a retrained model based on the feedback data. However, in some implementations, it is contemplated that the local devices do not need to implement such predictions and/or receive feedback on such predictions, and can instead collect and analyze user data to generate and transmit the updated model data to the laptop, without applying the master machine learning model. The laptop can analyze and aggregate the updated model data from the local devices, and provide either the adjusted weights for the model or the aggregated model back to the central computing system.

However, in some implementations, the laptop does not have to provide the master machine learning model to the individual local devices. In such implementations, the individual local devices can observe and collect data, such as user data, usage data, behavior data, environmental data, contextual data, etc., while the local devices are being used or unused. The local devices can then provide this data to the laptop, who can aggregate the data, retrain the master machine learning model to produce adjusted weights, and provide either the adjusted weights or the model retrained on the aggregated data back to the central computing system. In some implementations, the local devices can apply the retrained machine learning to personalize their services for that particular household.

In either implementation, the central computing system can receive updated model data (e.g., adjusted weights for its master machine learning model and/or retrained machine learning models) from multiple households, and can aggregate the updated model data. The central computing system can use the aggregated model data to update its master machine learning model to better predict user behavior across households with respect to IoT or other local devices. Thus, the central computing system can refine its master machine learning model without accessing individual households' potentially sensitive and/or identifying user data.

As used herein, a "central computing system" can be a server or set of servers located remotely from locally networked endpoint devices collecting data. The central computing system can be configured to train a global or master machine learning model using federated learning, in which the central computing system is not exposed to end user data. An "endpoint device peer ecosystem" can be a local network of endpoint "local" devices, such as collocated endpoint devices, e.g., in a particular household, office, classroom, or other location; endpoint devices on the same local network (e.g., using the same WiFi); and/or the like. A "locally networked endpoint device" and the like can be any user device configured to communicate with other locally networked endpoint devices and/or with a locally networked central device via a wired or wireless local network, such over WiFi, Bluetooth or Bluetooth Low Energy (LE), near field communication (NFC), etc.

A "locally networked central device" and the like can be any device configured to communicate with locally networked endpoint devices. In some implementations, the locally networked central device can itself by a locally networked endpoint device, and/or can be a hub or router for locally networked endpoint devices. In some implementations, the locally networked central device can be a device having certain advantages over other locally networked endpoint devices, such as a device having higher processing speed, lower latency, lower usage, higher availability, improved power capabilities (e.g., plugged into an outlet instead of on battery power), greater storage, increased random access memory (RAM), etc., than other locally networked endpoint devices.

The implementations described herein provide specific technological improvements in the field of machine learning. By allowing peer ecosystems to themselves retrain and/or update machine learning models, remote computing systems outside the control of the peer ecosystems do not need access to data collected by endpoint devices, which could be potentially sensitive, personally identifying, or private. In addition, the collected data does not need to be stored outside of the peer ecosystem, improving data security. Further, by preventing transmission of collected data outside of a local network, end-to-end network security between peer ecosystems and remote computing systems is improved. In addition, by implementing the aggregation of data and/or aggregation of updated machine learning models on a selected central device within the peer ecosystem, energy can be conserved on lower capability endpoint devices, in addition to improvements in processing speed and latency in generating updated machine learning models.

Several implementations are discussed below in more detail in reference to the figures. FIG. 1 is a block diagram illustrating an overview of devices on which some implementations of the disclosed technology can operate. The devices can comprise hardware components of a device 100 that can provide an endpoint device peer ecosystem for federated learning. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, endpoint device peer ecosystem 164, and other application programs 166. Memory 150 can also include data memory 170, e.g., global machine learning model data, parameter data, user data, usage data, contextual data, environmental data, training data, updated model data, aggregated data, aggregated model data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
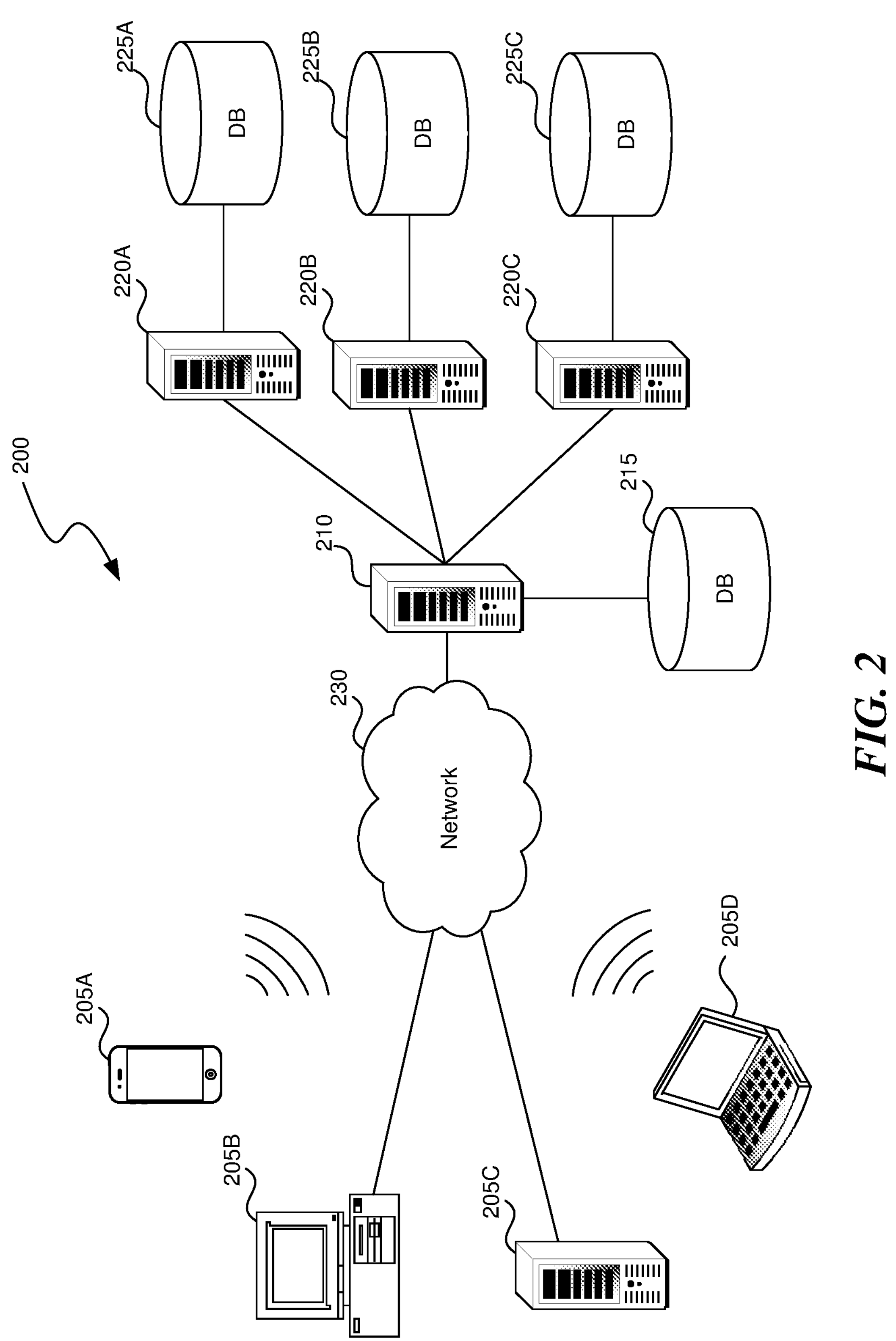
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as global machine learning model data, parameter data, user data, usage data, contextual data, environmental data, training data, updated model data, aggregated data, aggregated model data, etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
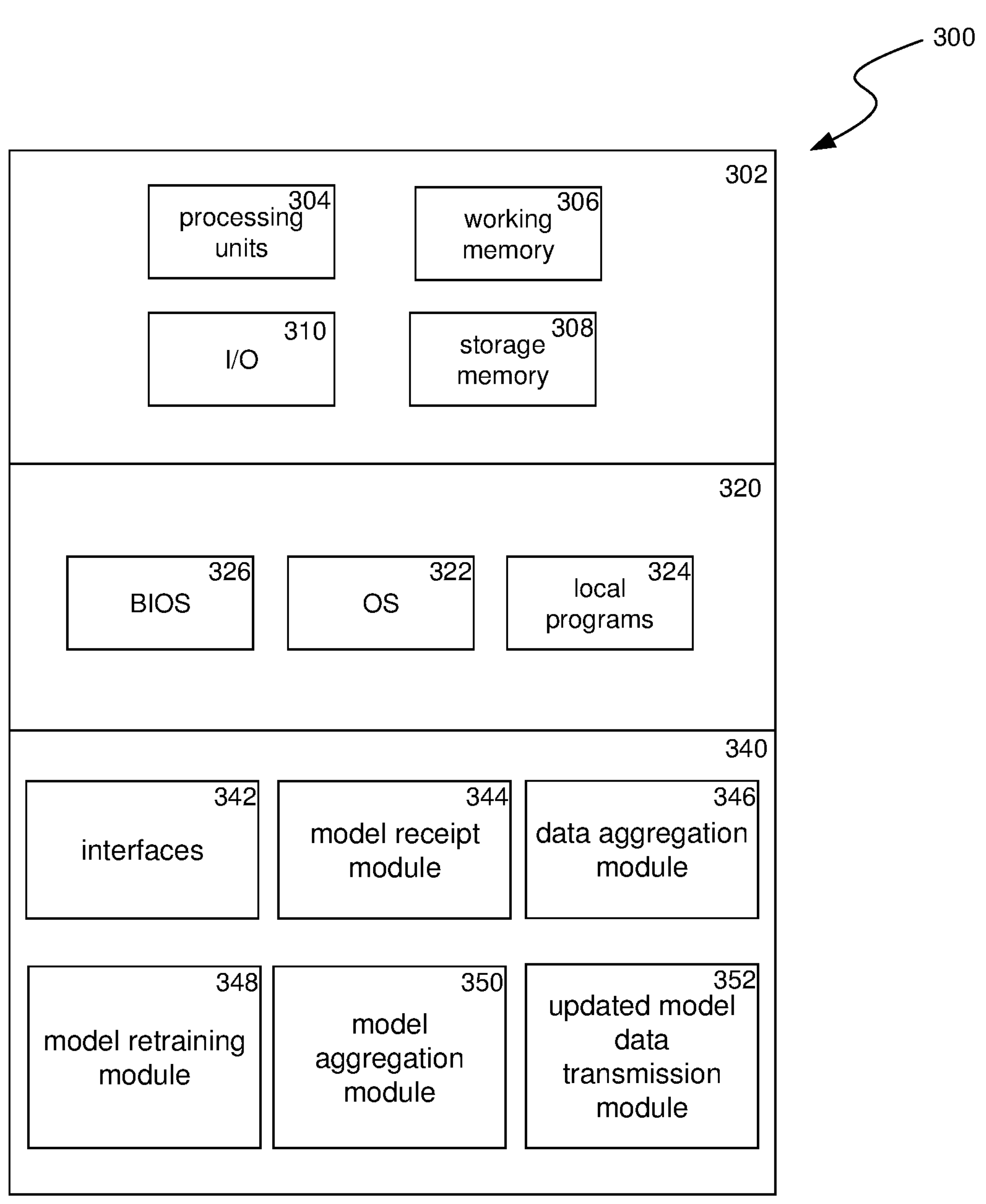
FIG. 3 is a block diagram illustrating components which, in some implementations, can be used in a locally networked central device employing the disclosed technology.

FIG. 3 is a block diagram illustrating components 300 which, in some implementations, can be used in a locally networked central device employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include model receipt module 344, data aggregation module 346, model retraining module 348, model aggregation module 350, updated model data transmission module 352, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Model receipt module 344 can receive a global machine learning model from a central computing system. Model receipt module 344 can receive the global machine learning model over any suitable network, such as network 230 of FIG. 2. The global machine learning model can be trained on parameters aggregated from multiple endpoint devices, such as weights applied to nodes of the model, based on datasets collected by and stored locally on the endpoint devices. The datasets can include any data relevant to an endpoint device, such as a type of endpoint device, actions taken on the endpoint device, location of the endpoint device, users of the endpoint device, etc. Further details regarding receiving a global machine learning model from a central computing system are described herein with respect to block 502 of FIG. 5.

In some implementations, data aggregation module 346 can aggregate data collected by locally networked endpoint devices within an endpoint device peer ecosystem. The collected data can include, for example, data regarding the locally networked endpoint devices (e.g., type of devices, location identifiers associated with the devices, etc.), data regarding users of the locally networked endpoint devices (e.g., name, age, and/or other demographics data), usage data of the locally networked endpoint devices (e.g., how and when the locally networked endpoint devices are used, e.g., turning on a smart outdoor light overnight), environmental data collected by sensors within locally networked endpoint devices (e.g., temperature data, ambient lighting data, motion data, location data, etc.), and/or the like. In some implementations, data aggregation module 346 can further aggregate contextual data, such as when the data was collected, weather conditions when the data was collected, time the data was collected, time of year the data was collected, day the data was collected, etc. Data aggregation module 346 can combine such data upon receipt from the locally networked endpoint devices over a local network, such as a WiFi network, a mesh network, a Bluetooth communication network, etc. Further details regarding aggregating data collected by locally networked endpoint devices within an endpoint device peer ecosystem are described with respect to block 504 of FIG. 5.

Model retraining module 348 can generate a retrained instance of the global machine learning model. In some implementations, model retraining module 348 can update the parameters of the global machine learning model based on data aggregated by data aggregation module 346 as part of generating the retrained instance. For example, model retraining module 348 can adjust weights applied to the various nodes of the global machine learning model based on the data aggregated by data aggregation module 346. Further details regarding generating a retrained instance of a global machine learning model are described herein with respect to block 506 of FIG. 5. Although specialized components 340 are illustrated and described as including data aggregation module 346 and model retraining module 348, it is contemplated that in some implementations (such as when locally networked endpoint devices collecting data also update the global machine learning model, e.g., by data collection module 446 and model retraining module 450 of FIG. 4), data aggregation module 346 and/or model retraining module 348 can be omitted from specialized components 340.

Model aggregation module 350 can aggregate retrained instances of the global machine learning model. In some implementations, locally networked endpoint devices can retrain the global machine learning model according to collected data to reflect actual behavior and/or actions (as opposed to predicted behavior and/or actions reflected in the global machine learning model) with respect to the locally networked endpoint devices. Model aggregation module 350 can receive retrained instances of the global machine learning model, and adjust the parameters of the global machine learning model to reflect the aggregated parameters of the retrained instances. However, although specialized components 340 are illustrated and described as including model aggregation module 350, it is contemplated that in some implementations (such as when locally networked endpoint devices transmit collected data aggregated by data aggregation module 346, e.g., by collected data transmission module 448), model aggregation module 350 can be omitted from specialized components 340.

Updated model data transmission module 352 can transmit updated model data to the central computing system from which model receipt module 344 received the global machine learning model. The updated model data can include the updated or aggregated model, and/or parameters of the updated or aggregated model. Updated model data transmission module 352 can transmit the updated model data to the central computing system via any suitable network, such as network 230 of FIG. 2, which can be the same or a different network from which model receipt module 344 received the global machine learning model. In some implementations, updated model data transmission module 352 can transmit the updated model data generated by model retraining module 348. In some implementations, updated model data transmission module 352 can transmit the updated model data generated by model aggregation module 350. Further details regarding transmitting updated model data are described herein with respect to block 508 of FIG. 5.

Figure 4:
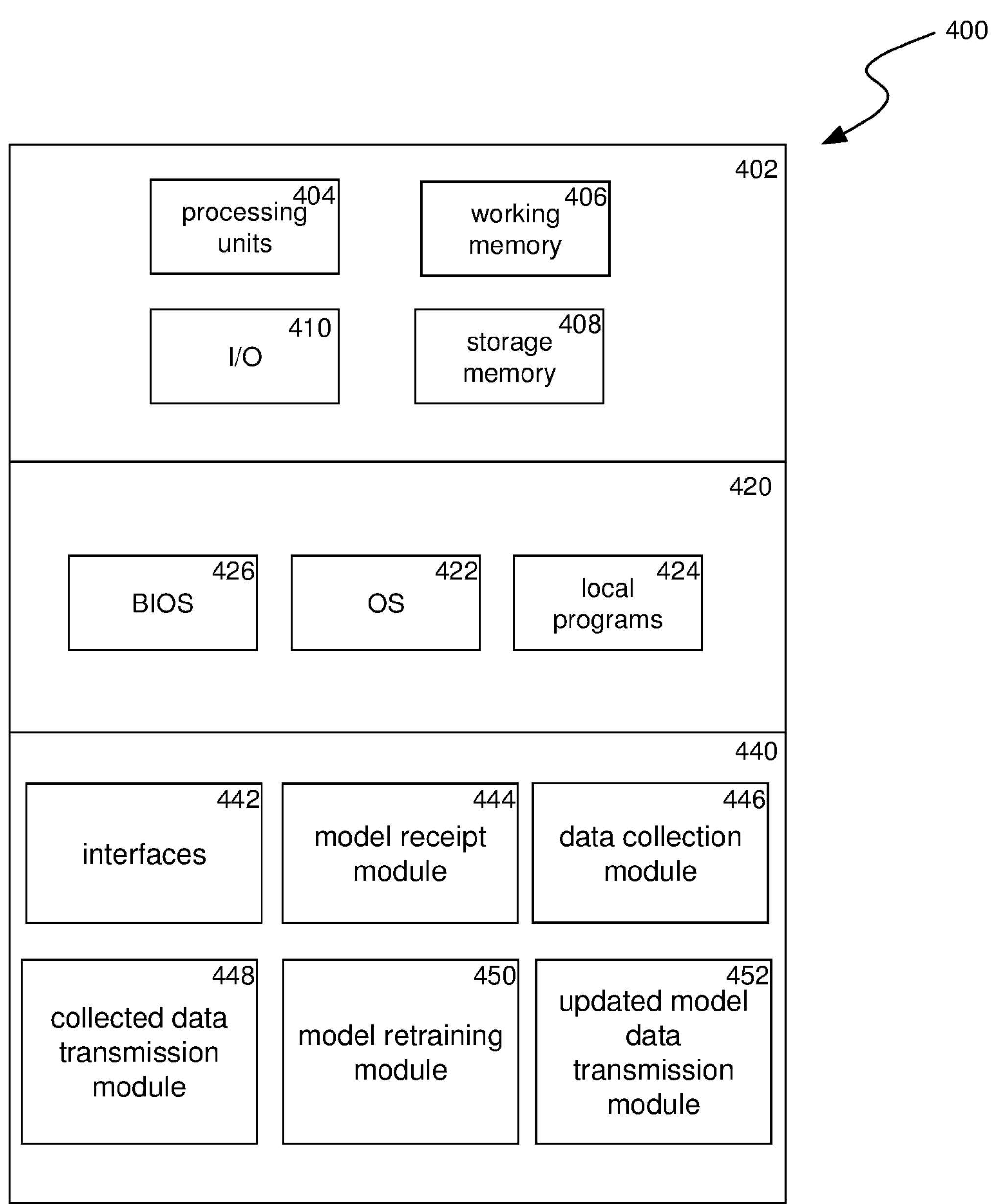
FIG. 4 is a block diagram illustrating components which, in some implementations, can be used in a locally networked endpoint device employing the disclosed technology.

FIG. 4 is a block diagram illustrating components 400 which, in some implementations, can be used in a locally networked endpoint device employing the disclosed technology. The components 400 include hardware 402, general software 420, and specialized components 440. As discussed above, a system implementing the disclosed technology can use various hardware including processing units 404 (e.g. CPUs, GPUs, APUs, etc.), working memory 406, storage memory 408 (local storage or as an interface to remote storage, such as storage 215 or 225), and input and output devices 410. In various implementations, storage memory 408 can be one or more of: local devices, interfaces to remote storage devices, or combinations thereof. For example, storage memory 408 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 400 can be implemented in a client computing device such as client computing devices 205 or on a server computing device, such as server computing device 210 or 220.

General software 420 can include various applications including an operating system 422, local programs 424, and a basic input output system (BIOS) 426. Specialized components 440 can be subcomponents of a general software application 420, such as local programs 424. Specialized components 440 can include model receipt module 444, data collection module 446, collected data transmission module 448, model retraining module 450, updated model data transmission module 452, and components which can be used for providing user interfaces, transferring data, and controlling the specialized components, such as interfaces 442. In some implementations, components 400 can be in a computing system that is distributed across multiple computing devices or can be an interface to a server-based application executing one or more of specialized components 440. Although depicted as separate components, specialized components 440 may be logical or other nonphysical differentiations of functions and/or may be submodules or code-blocks of one or more applications.

In some implementations, model receipt module 444 can receive a global machine learning model from a central computing system. In some implementations, model receipt module 444 can receive the global machine learning model from the central computing system via a locally networked endpoint device, such as a locally networked central drive.

The global machine learning model can be trained by the central computing system by aggregating parameters of instances of the global machine learning model provided by multiple endpoint devices. The endpoint devices, such as IoT devices, smart devices, sensors, wearable devices, or other electronic devices, can collect user and/or usage data to retrain the instances of the global machine learning model, then provide the parameters and/or the retrained instances of the global machine learning model to the central computing system, in order for the central computing system to update and/or refine the global machine learning model. Further details regarding receiving a global machine learning model from a central system are described herein with respect to block 702 of FIG. 7. However, in some implementations, it is contemplated that model receipt module 444 can be omitted from specialized components 440, such as when a locally networked endpoint device aggregates collected data and retrains the global machine learning model, e.g., by data aggregation module 346 and model retraining module 348 of FIG. 3.

Data collection module 446 can collect data via a locally networked endpoint device of an endpoint device peer ecosystem comprised of a set of locally networked endpoint devices. The data can include, for example, data regarding the locally networked endpoint device (e.g., type of device, location identifiers associated with the device, etc.), data regarding users of the locally networked endpoint device (e.g., name, age, and/or other demographics data), usage data of the locally networked endpoint device (e.g., how and when the locally networked endpoint devices are used), environmental data collected by sensors within locally networked endpoint devices (e.g., temperature data, ambient lighting data, motion data, location data, etc.), and/or the like. In some implementations, data collection module 446 can further collect contextual data, such as when the data was collected, weather conditions when the data was collected, time the data was collected, time of year the data was collected, day the data was collected, etc. Further details regarding collecting data via a locally networked endpoint device of an endpoint device peer ecosystem are described with respect to block 704 of FIG. 7.

In some implementations, collected data transmission module 448 can transmit the data collected by data collection module 446 to a locally networked endpoint device, such as a locally networked central device aggregating the data from multiple locally networked endpoint devices. Collected data transmission module 448 can transmit the collected data over any suitable network, such as network 230 of FIG. 2. In some implementations, collected data transmission module 448 can transmit the collected data via a local network, such as WiFi, Bluetooth, Bluetooth Low Energy (LE), near field communication, a mesh network, etc., which, in some implementations, can be aggregated and used to retrain the global machine learning model, e.g., by data aggregation module 346 and model retraining module 348 of FIG. 3.

In some implementations, model retraining module 450 can generate a retrained instance of the global machine learning model received by model receipt module 444. In some implementations, model retraining module 450 can update the parameters of the global machine learning model based on data collected by data collection module 446 as part of generating the retrained instance. For example, model retraining module 450 can adjust weights applied to the nodes of the global machine learning model based on the data collected by data collection module 446. In some implementations, model retraining module 450 can further apply the retrained instance of the machine learning model in order to personalize services provided by the locally networked endpoint device. Further details regarding generating a retrained instance of a global machine learning model are described herein with respect to block 706 of FIG. 7.

In some implementations, updated model data transmission module 452 can transmit updated model data to a locally networked endpoint device of the endpoint device peer ecosystem. The updated model data can include at least one of A) the instance of the global machine learning model retrained by model retraining module 450, B) the parameters of the instance of the global machine learning model updated by model retraining module 450, or both. In some implementations, the updated model data transmitted by updated model data transmission module 452 does not include the data collected by data collection module 446. Updated model data transmission module 452 can transmit the collected data over any suitable network, such as network 230 of FIG. 2. In some implementations, updated model data transmission module 452 can transmit the updated model data via a local network, such as WiFi, Bluetooth, Bluetooth Low Energy (LE), near field communication, a mesh network, etc., which, in some implementations, can be aggregated and transmitted to a central computing system, e.g., by model aggregation module 350 and updated model data transmission module 352 of FIG. 3. Further details regarding transmitting updated model data to a locally networked endpoint device of an endpoint device peer ecosystem are described herein with respect to block 708 of FIG. 7. Although specialized components 440 are illustrated and described as including model retraining module 450 and updated model data transmission module 452, it is contemplated that in some implementations (e.g., when collected data transmission module 448 transmits the data collected by data collection module 446 to a locally networked endpoint device), model retraining module 450 and updated model data transmission module 452 can be omitted from specialized components 440.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
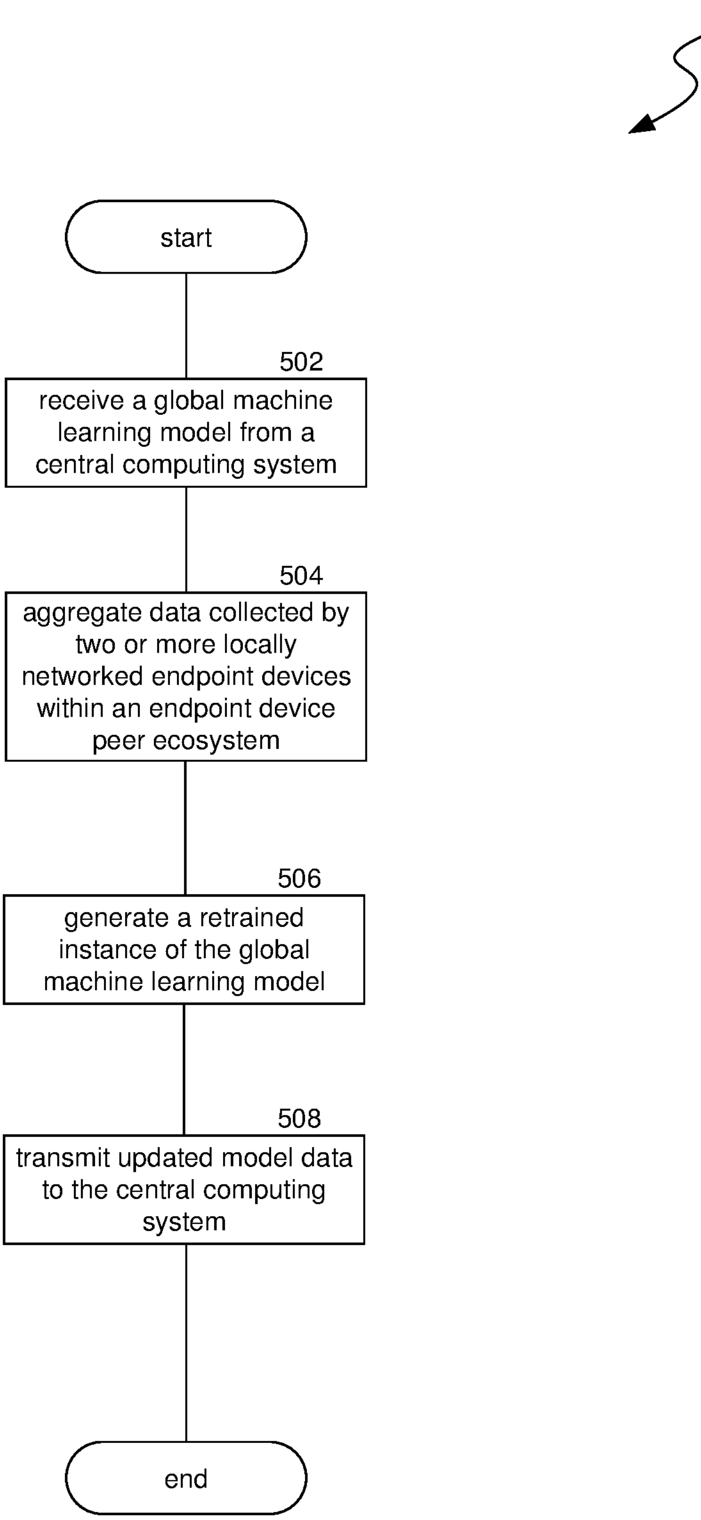
FIG. 5 is a flow diagram illustrating a process used in some implementations for providing an endpoint device peer ecosystem for federated learning, wherein a locally networked central device aggregates collected data from locally networked endpoint devices and updates a global model received from a central computing system.

FIG. 5 is a flow diagram illustrating a process 500 used in some implementations for providing an endpoint device peer ecosystem for federated learning, wherein a locally networked central device aggregates collected data from locally networked endpoint devices and updates a global model received from a central computing system. In some implementations, process 500 is performed as a response to receipt of a global machine learning model. In some implementations, process 500 can be performed by a locally networked endpoint device, such as a locally networked central device, within a peer ecosystem.

At block 502, process 500 can receive a global machine learning model from a central computing system. The central computing system can be, for example, a server or set of servers located remotely from the endpoint device peer ecosystem. In some implementations, the central computing system can be associated with a provider of the locally networked endpoint devices within the peer ecosystem. The global machine learning model, or master machine learning model, can be trained on parameters aggregated from multiple endpoint devices, which can be within multiple peer ecosystems. In some implementations, the parameters can be weights applied to nodes of the global machine learning model.

In some implementations, the endpoint devices can generate the parameters based on one or more local datasets collected by them. The local datasets can include data such as user data associated with users using the endpoint devices (e.g., demographics data, household data, etc.), usage data by users of the endpoint devices (e.g., when, for how long, and/or how the endpoint devices are being used), contextual data surrounding usage of the endpoint devices (e.g., time of day or year that the endpoint devices are used, where the endpoint devices are used, etc.), environmental data (e.g., conditions under which the endpoint devices are used, e.g., when there is low ambient light), feedback data, etc.

In some implementations, process 500 can provide the global machine learning model to two or more locally networked endpoint devices and/or apply the global machine learning model to two or more locally networked endpoint devices. Thus, the two or more locally networked endpoint devices can apply predicted actions on the locally networked endpoint devices, and receive implicit or explicit feedback about the predicted actions. The two or more locally networked endpoint devices can then provide such feedback data to process 500.

At block 504, process 500 can aggregate data collected by multiple locally networked endpoint devices within the endpoint device peer ecosystem. In some implementations, another locally networked endpoint device within the endpoint device peer ecosystem can aggregate the data collected by the multiple locally networked endpoint devices. In some implementations, the other locally networked endpoint device can be a locally networked central device having certain advantages over other locally networked endpoint devices, such as a device having higher processing speed, improved latency, lower usage, higher availability, improved power capabilities (e.g., plugged into an outlet instead of on battery power), greater local storage, increased random access memory (RAM), etc., than other locally networked endpoint devices. In some implementations, process 500 can select the other locally networked endpoint device to aggregate the data from the multiple locally networked endpoint devices based on one or more of such advantages. In some implementations, the other locally networked endpoint device can be a computing system (e.g., a desktop or laptop computer), a tablet, a mobile phone, an Internet-of-Things (IoT) hub, a WiFi router, a gaming system, a smart television, etc.

The endpoint device peer ecosystem can be a local network of endpoint devices, such as collocated endpoint devices (e.g., in a room, in a household, in an office, in a classroom, in a school, in a business, etc.), that can access the same local network (e.g., using the same WiFi), and, in some implementations, are able to communicate with each other directly or via another endpoint device, such as a central endpoint device (e.g., a hub, router, etc.). In some implementations, the two or more locally networked endpoint devices can include two or more of an IoT device, a vehicle, a computing device (e.g., a desktop or laptop computer), a mobile device (e.g., a tablet, a mobile phone, etc.), a wearable device, a smart device, a sensor, a gaming system, a television, a speaker, a WiFi router, or any combination thereof. In some implementations, the multiple locally networked endpoint devices can communicate via at least one of Bluetooth, near field communication, a mesh network, WiFi, a cellular network, or any combination thereof.

Similar to the datasets used to generate the parameters of the global machine learning model, the data collected by the two or more locally networked endpoint devices can include user data associated with users using the endpoint devices (e.g., demographics data, household data, etc.), usage data by users of the endpoint devices (e.g., when, for how long, and/or how the endpoint devices are being used), contextual data surrounding usage of the endpoint devices (e.g., time of day or year that the endpoint devices are used, where the endpoint devices are used, etc.), environmental data (e.g., conditions under which the endpoint devices are used, e.g., when there is low ambient light), feedback data, etc., specific to the endpoint device peer ecosystem.

At block 506, process 500 can generate a retrained instance of the global machine learning model. In generating the retrained instance of the global machine learning model, process 500 can update the parameters, on which the global machine learning model was trained, based on the aggregated data. Thus, the retrained instance of the global machine learning model can be a version of the model refined for the endpoint device peer ecosystem. In some implementations, the retrained instance of the global machine learning model can be used to personalize services provided by the multiple locally network endpoint devices, such as to suggest, target, or streamline information, to cause changes in a user's environment (e.g., activate or deactivate IoT devices), etc. Further details regarding applying updating a trained machine learning model are described herein with respect to FIG. 10.

At block 508, process 500 can transmit updated model data to the central computing system. In some implementations, process 500 can transmit the updated model data to the central computing system via a federated learning tower. The federated learning tower can be, for example, a base station receiving the updated model data, and aggregating the updated model data with other updated model data received from one or more other endpoint devices and/or endpoint device peer ecosystems. In some implementations, the one or more other endpoint devices can be within a threshold distance of the multiple locally networked endpoint devices, e.g., can be in a same local area as the multiple locally networked endpoint devices, but in different peer ecosystems. In other words, the one or more other endpoint devices can be outside of the endpoint device peer ecosystem including the multiple locally networked endpoint devices. Further details regarding a federated learning tower are described herein with respect to FIG. 9.

The updated model data can include at least one of A) the retrained instance of the global machine learning model, B) the updated parameters, or C) both. The central computing system can then update the global machine learning model based on the updated model data. In some implementations, the updated model data does not include the aggregated data received from the multiple locally networked endpoint devices. Thus, the endpoint device peer ecosystem can retain control of its collected data, which could be sensitive, personal, or identifying, while still allowing the central computing system to refine its global machine learning model.

Figure 6:
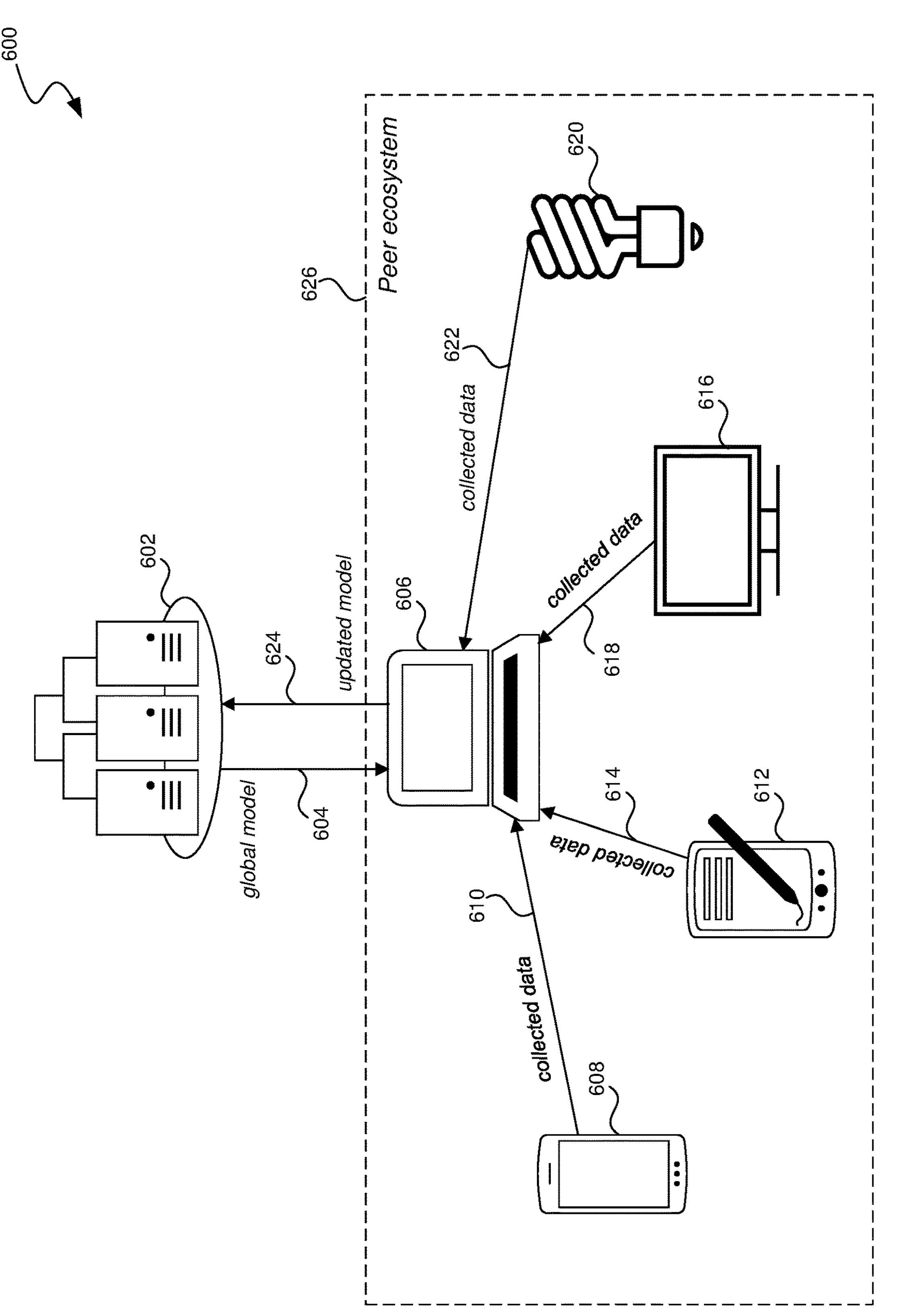
FIG. 6 is a block diagram illustrating a system in which a locally networked central device aggregates collected data from locally networked endpoint devices and updates a global model received from a central computing system.

FIG. 6 is a block diagram illustrating a system 600 in which a locally networked central device 606 aggregates collected data from locally networked endpoint devices 608, 612, 616, 620, and updates a global model 604 received from a central computing system 602. Locally networked central device 606 can be in an endpoint device peer ecosystem 626 with locally networked endpoint devices 608, 612, 616, 620, e.g., locally networked endpoint devices 608, 612, 616, 620 can all be in operative communication with locally networked central device 606; locally networked endpoint devices 608, 612, 616, 620 and locally networked central device 606 can all be in operative communication with each other; and/or locally networked endpoint devices 608, 612, 616, 620 and locally networked central device 606 can all be on the same local network and/or using the same communication protocol (e.g., using the same WiFi connection, communicating via Bluetooth, etc.). In exemplary system 600, locally networked endpoint devices 608, 612, 616, 620 and locally networked central device 606 can include computing devices, IoT devices, and/or smart devices. For example, locally networked endpoint device 608 can be a mobile phone, locally networked endpoint device 612 can be a tablet, locally networked endpoint device 616 can be a smart television, locally networked endpoint device 620 can be a smart bulb; and locally networked central device 606 can be a computer.

Central computing system 602, which can be located remotely from peer ecosystem 626, can transmit global model 604 to locally networked central device 606 via any suitable network, such as network 230 of FIG. 2. Global model 604 can be a master machine learning model predicting actions and/or behaviors with respect to locally networked endpoint devices 608, 612, 616, 620, and, in some implementations, locally networked central device 606. Central computing system 602 can train global model 604 using raw datasets of actions and/or behaviors with respect to endpoint devices, using parameters and/or weights of nodes within previous instances of global model 604 updated by peer ecosystems, using previous instances of global model 604 updated by peer ecosystems, etc.

Locally networked central device 606 can receive global model 604. Prior to, concurrently with, or after receipt of global model 604, locally networked central device 606 can receive collected data as input, e.g., can receive collected data 610 from locally networked endpoint device 608, collected data 614 from locally networked endpoint device 612, collected data 618 from locally networked endpoint device 616, and collected data 622 from locally networked endpoint device 620. Collected data 610, 614, 618, 622 can include any data relevant to locally networked endpoint devices 608, 612, 616, 620, respectively. For example, collected data 610 of locally networked endpoint device 608 (e.g., a mobile phone) can include a type of mobile phone, a location of the mobile phone, phone calls made or received by the mobile phone, text messages made or received by the mobile phone, applications installed and/or accessed on the mobile phone, websites accessed on the mobile phone, internet searches made on the mobile phone, cookies, etc. As another example, collected data 622 of locally networked endpoint device 620 (e.g., a smart bulb) can include a type of smart bulb, when the smart bulb is turned on and off, what level of lighting the smart bulb is providing and when, where the smart bulb is located, etc.

Locally networked central device 606 can aggregate collected data 610, 614, 618, 622, analyze collected data 610, 614, 618, 622 to draw conclusions, and update global model 604 based on collected data 610, 614, 618, 622. For example, locally networked central device 606 can adjust parameters and/or weights at nodes of global model 604 predicting particular actions taken on locally networked endpoint devices 608, 612, 616, 620, based on the actual actions of locally networked endpoint devices 608, 612, 616, 620, i.e., to reflect actual user behavior with respect to locally networked endpoint devices 608, 612, 616, 620. Locally networked central device 606 can then provide an updated model 624 to central computing system 602. In some implementations, central computing system 602 can aggregate multiple updated models from multiple peer ecosystems in order to update and/or refine global model 604, without being exposed to collected data 610, 614, 618, 622 and data collected by other locally networked endpoint devices within other peer ecosystems.

In some implementations, security communication protocols, privacy levels, data ownership, and/or data editing privileges can be different within peer ecosystem 626, as opposed to outside of peer ecosystem 626 (e.g., in communicating with central computing system 602). For example, the data format within a household's WiFi (e.g., a network used within peer ecosystem 626) may not be encrypted for communication to a peer hub (e.g., locally networked central device 606) from IoT devices (e.g., locally networked endpoint devices 608, 612, 616, 620). Conversely, updated parameters and/or updated model 624 can be encrypted and/or obfuscated before transmission to central computing system 602. Further, in some implementations, one or more users of devices within peer ecosystem 626 (e.g., household members or head-of-household) can have the ability to edit and modify data and model weights. Conversely, once updated parameters and/or updated model 624 is transmitted to central computing system 602, the ability to edit the information can be removed in some implementations.

In some implementations, the geographic location of peer ecosystem 626 can impact speed and latency, and the type of network used to communicate within peer ecosystem 626 can be different than the type of network used outside of peer ecosystem 626. For example, using WiFi within peer ecosystem 626 can have faster data transfer rates than 3G or 4G cellular communication used for locally networked central device 606 to communicate with central computing system 602. The qualities of these network protocols can influence the definition of specifications for data size and type for collected data 610, 614, 618, 622 and updated model 624.

In some implementations, central computing system 602 can have parameters that define attributes such as a desired population number, desired population data characteristics, desired memory available, desired compute capabilities, desired geographic location, etc. In some implementations, however, locally networked central device 606 can choose not to discriminate against an IoT participant (e.g., one or more of locally networked endpoint devices 608, 612, 616, 620) because it does not have enough memory, compute capacity, etc.

Figure 7:
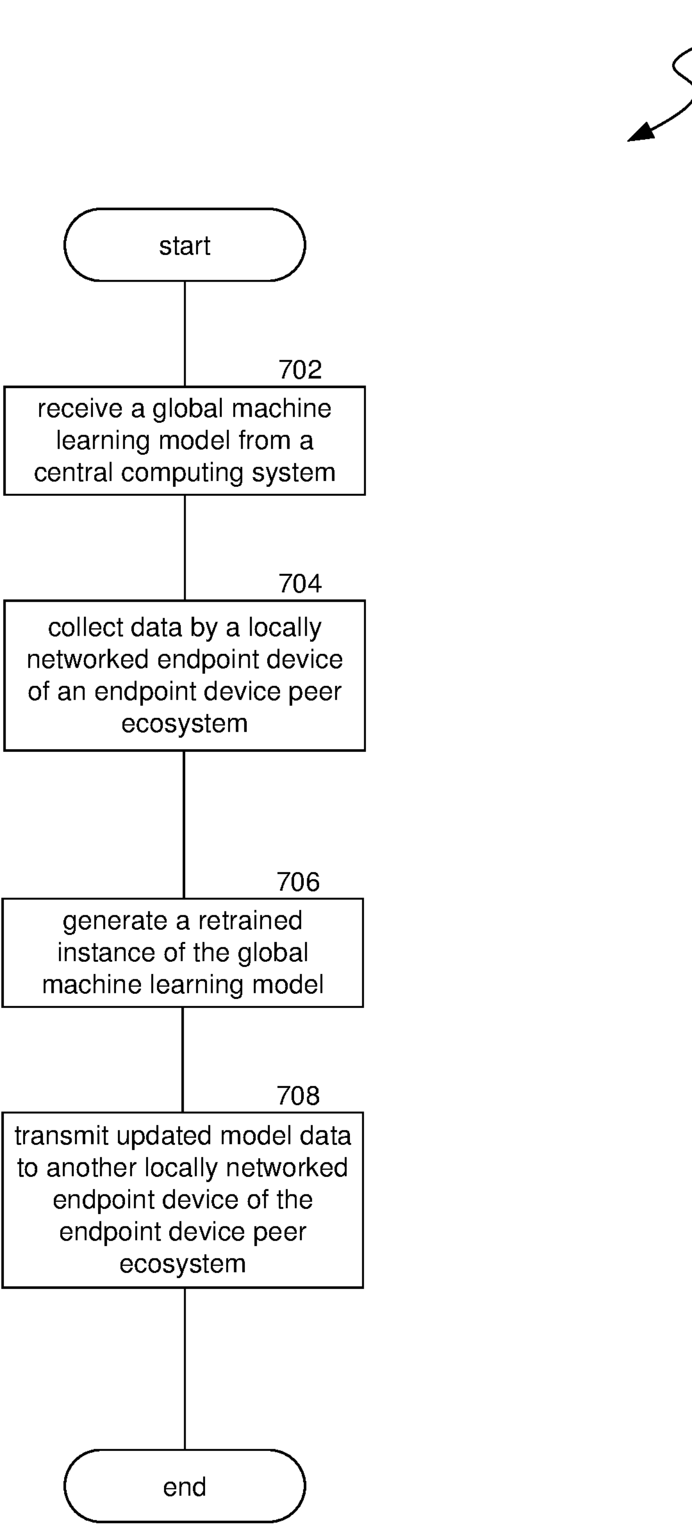
FIG. 7 is a flow diagram illustrating a process used in some implementations for providing an endpoint device peer ecosystem for federated learning, wherein a locally networked endpoint device updates a global model received from a central computing system, and a locally networked central device aggregates updated models for transmission back to the central computing system.

FIG. 7 is a flow diagram illustrating a process 700 used in some implementations for providing an endpoint device peer ecosystem for federated learning, wherein a locally networked endpoint device updates a global model received from a central computing system, and a locally networked central device aggregates updated models for transmission back to the central computing system. In some implementations, process 700 can be performed as a response to receipt of a global machine learning model. In some implementations, process 700 can be performed by a locally networked endpoint device collecting data within a peer ecosystem.

At block 702, process 700 can receive a global machine learning model from a central computing system. In some implementations, process 700 can receive the global machine learning model from the central computing system via another locally networked endpoint device, such as a locally networked central device. The global machine learning model, or master machine learning model, can be trained on parameters aggregated from multiple endpoint devices, which can be within multiple peer ecosystems, e.g., within other households, other workplaces, other businesses, etc. In some implementations, the parameters can be weights applied to nodes of the global machine learning model. In some implementations, the endpoint devices can generate the parameters based on one or more local datasets collected by them. The local datasets can include data such as user data associated with users using the endpoint devices, usage data by users of the endpoint devices, contextual data surrounding usage of the endpoint devices environmental data, feedback data, etc., as described further herein.

At block 704, process 700 can collect data by a locally networked endpoint device of the endpoint device peer ecosystem. As with the local datasets used to generate parameters of the global machine learning model, the data can include data such as user data associated with users using the endpoint devices, usage data by users of the endpoint devices, contextual data surrounding usage of the endpoint devices environmental data, etc., as described further herein. In some implementations, the data can include feedback data. For example, process 700 can apply the global machine learning model on the locally networked endpoint device. The locally networked endpoint device can take predicted actions based on the global machine learning model, and receive implicit or explicit feedback about the predicted actions. The locally networked endpoint devices can then collect such feedback data at block 704.

At block 706, process 700 can generate a retrained instance of the global machine learning model. In generating the retrained instance of the global machine learning model, process 700 can update the parameters (e.g., weights associated to nodes), on which the global machine learning model was trained, based on the aggregated data. Thus, the retrained instance of the global machine learning model can be a version of the model refined for a particular endpoint device peer ecosystem (e.g., a particular household). In some implementations, the retrained instance of the global machine learning model can be used to personalize services provided by the locally networked endpoint devices, such as to target or streamline information, to cause changes in a user's environment (e.g., activate or deactivate IoT devices), to make suggestions for actions to take in the user's environment, etc. Further details regarding applying and updating a trained machine learning model are described herein with respect to FIG. 10, At block 708, process 700 can transmit updated model data to another locally networked endpoint device of the endpoint device peer ecosystem. In some implementations, the other locally networked endpoint device of the endpoint device peer ecosystem can be a locally networked central device, such as a hub or router. In some implementations, the other locally networked endpoint device can aggregate the updated model data with other updated model data generated by other locally networked endpoint devices within the endpoint device peer ecosystem, and transmit the aggregated updated model data to the central computing system.

In some implementations, the other locally networked endpoint device can transmit the updated model data to the central computing system via a federated learning tower. The federated learning tower can be, for example, a base station receiving the aggregated updated model data, and aggregating the ecosystem-aggregated updated model data with other aggregated or otherwise updated model data received from one or more other endpoint devices in different peer ecosystems. In some implementations, the one or more other endpoint devices can be within a threshold distance of the locally networked endpoint device collecting data and generating the retrained instance, e.g., can be in a same local area as the locally networked endpoint devices. Further details regarding a federated learning tower are described herein with respect to FIG. 9.

The updated model data can include at least one of A) the retrained instance of the global machine learning model, B) the updated parameters, or C) both. The central computing system can update the global machine learning model based on the ecosystem-aggregated updated model data. In some implementations, the updated model data does not include the data collected by the locally networked endpoint device or other locally networked endpoint devices within the endpoint device peer ecosystem. Thus, the central computing system (and, in some implementations, the federated learning tower) are not exposed to collected data, but are still able to facilitate updating and refinement of the global machine learning model.

Figure 8:
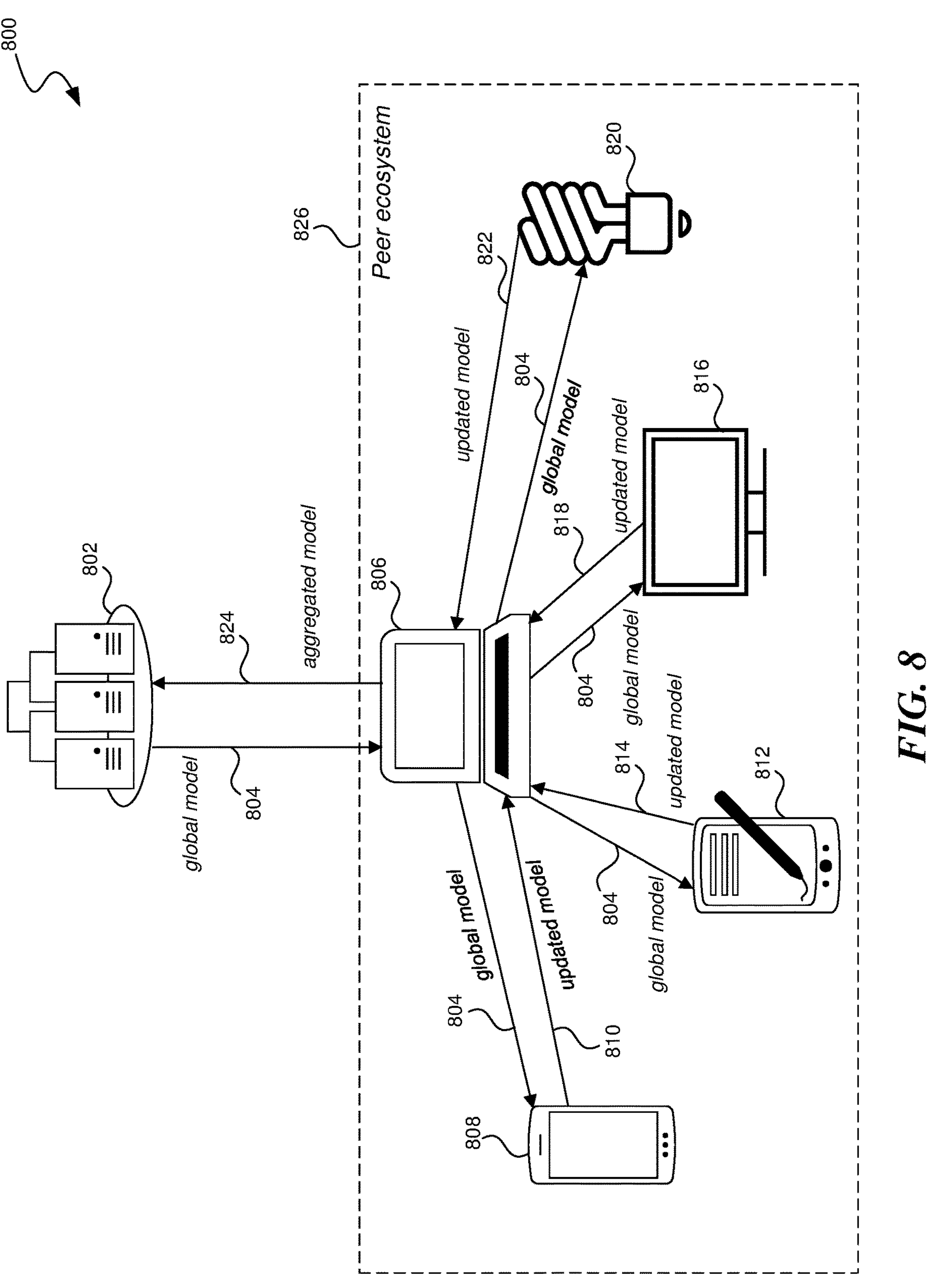
FIG. 8 is a block diagram illustrating a system in which a locally networked central device aggregates updated models retrained by locally networked endpoint devices.

FIG. 8 is a block diagram illustrating a system 800 in which a locally networked central device 806 aggregates updated models 810, 814, 818, 822 retrained by locally networked endpoint devices 808, 812, 816, 820, respectively. Locally networked central device 806 can be in an endpoint device peer ecosystem 826 with locally networked endpoint devices 808, 812, 816, 820, e.g., locally networked endpoint devices 808, 812, 816, 820 can all be in operative communication with locally networked central device 806; locally networked endpoint devices 808, 812, 816, 820 and locally networked central device 806 can all be in operative communication with each other; and/or locally networked endpoint devices 808, 812, 816, 820 and locally networked central device 806 can all be on the same local network and/or using the same communication protocol (e.g., using the same WiFi connection, communicating via Bluetooth, etc.). In exemplary system 800, locally networked endpoint devices 808, 812, 816, 820 and locally networked central device 806 can include computing devices, IoT devices and/or smart devices. For example, locally networked endpoint device 808 can be a mobile phone, locally networked endpoint device 812 can be a tablet, locally networked endpoint device 816 can be a smart television, locally networked endpoint device 820 can be a smart bulb; and locally networked central device 606 can be a computer.

Central computing system 802, which can be located remotely from peer ecosystem 826, can transmit global model 804 to locally networked central device 806 via any suitable network, such as network 230 of FIG. 2. Global model 804 can be a "master" machine learning model predicting actions and/or behaviors with respect to locally networked endpoint devices 808, 812, 816, 820, and, in some implementations, locally networked central device 806. In some implementations, central computing system 802 can initially train global model 804 using raw datasets of actions and/or behaviors with respect to endpoint devices within peer ecosystems. However, in some implementations, central computing system 802 can initially train global model 804 using parameters and/or weights of nodes within previous instances of global model 804 updated by peer ecosystems, using previous instances of global model 804 updated by peer ecosystems, etc.

Locally networked central device 806 can receive global model 804. After locally networked central device 806 receives global model 804, locally networked central device 806 can provide global model 804 to each of locally networked endpoint devices 808, 812, 816, 820. Upon receipt of global model 804 by locally networked endpoint devices 808, 812, 816, 820, locally networked endpoint devices 808, 812, 816, 820 can collect data. The data collected by locally networked endpoint devices 808, 812, 816, 820 can include any data relevant to locally networked endpoint devices 808, 812, 816, 820, respectively. For example, locally networked endpoint device 816 (e.g., a smart television) can collect data including a type of television, a location of the television, channels accessed on the television and when, shows watched on the television and when, applications installed on the television (e.g., streaming services) and their data, when the television is on, when the television is off, who is watching the television, etc.

Each of locally networked endpoint devices 808, 812, 816, 820 can, based on their respective collected data, analyze the collected data to draw conclusions, and update global model 804 based on their respective collected data. For example, locally networked endpoint devices 808, 812, 816, 820 can adjust parameters and/or weights at nodes of global model 804 predicting particular actions taken on locally networked endpoint devices 808, 812, 816, 820, based on the actual actions of locally networked endpoint devices 808, 812, 816, 820, i.e., to reflect actual user behavior with respect to locally networked endpoint devices 808, 812, 816, 820. Locally networked endpoint devices 808, 812, 816, 820 can then transmit their respective updated models 810, 814, 818, 822 to locally networked central device 806, such as over their local network. Although referred to herein as updated models 810, 814, 818, 822, it is contemplated that locally networked endpoint devices 808, 812, 816, 820 can alternatively or additionally provide the updated parameters and/or weights of the updated models 810, 814, 818, 822.

Upon receipt, locally networked central device 806 can aggregate updated models 810, 814, 818, 822, e.g., adjust the parameters (e.g., weights) at nodes of global model 804 to reflect parameters adjusted by each of locally networked endpoint devices 808, 812, 816, 820. Locally networked central device 806 can then provide an aggregated model 824 to central computing system 802. In some implementations, central computing system 802 can aggregate multiple updated and/or aggregated models from multiple peer ecosystems in order to update and/or refine global model 804, without being exposed to the actual data collected by locally networked endpoint devices 808, 812, 816, 820 and other locally networked endpoint devices within other peer ecosystems.

In some implementations, security communication protocols, privacy levels, data ownership, and/or data editing privileges can be different within peer ecosystem 826, as opposed to outside of peer ecosystem 826 (e.g., in communicating with central computing system 802). For example, the data format within a household's WiFi (e.g., a network used within peer ecosystem 826) may not be encrypted for communication to and from a peer hub (e.g., locally networked central device 806) with IoT devices (e.g., locally networked endpoint devices 808, 812, 816, 820). Conversely, parameters (e.g., machine learning model weights) and/or aggregated model 824 generated by locally networked central device 806 can be encrypted and/or obfuscated before transmission to central computing system 802. Further, in some implementations, one or more users of devices within peer ecosystem 826 can edit and/or modify data and model weights (e.g., a head-of-household and/or household members). Conversely, once parameters are communicated to central computing system 802, the ability to edit the information can be removed in some implementations.

Further, it is contemplated that the geographic location of peer ecosystem 826 can impact speed and latency. For example, using WiFi within peer ecosystem 826 can have faster data transfer rates than 3G or 4G cellular communication used for locally networked central device 806 to communicate with central computing system 802. The qualities of these network protocols can influence the definition of specifications for data size and type for model parameters, updated models 810, 814, 818, 822, and/or aggregated model 824.

In some implementations, central computing system 802 can have parameters that define attributes such as a desired population number, desired population data characteristics, desired memory available, desired compute capabilities, desired geographic location, etc. In some implementations, however, locally networked central device 606 can choose not to discriminate against an IoT participant (e.g., one or more of locally networked endpoint devices 608, 612, 616, 620) because it does not have enough memory, compute capacity, etc.

Figure 9:
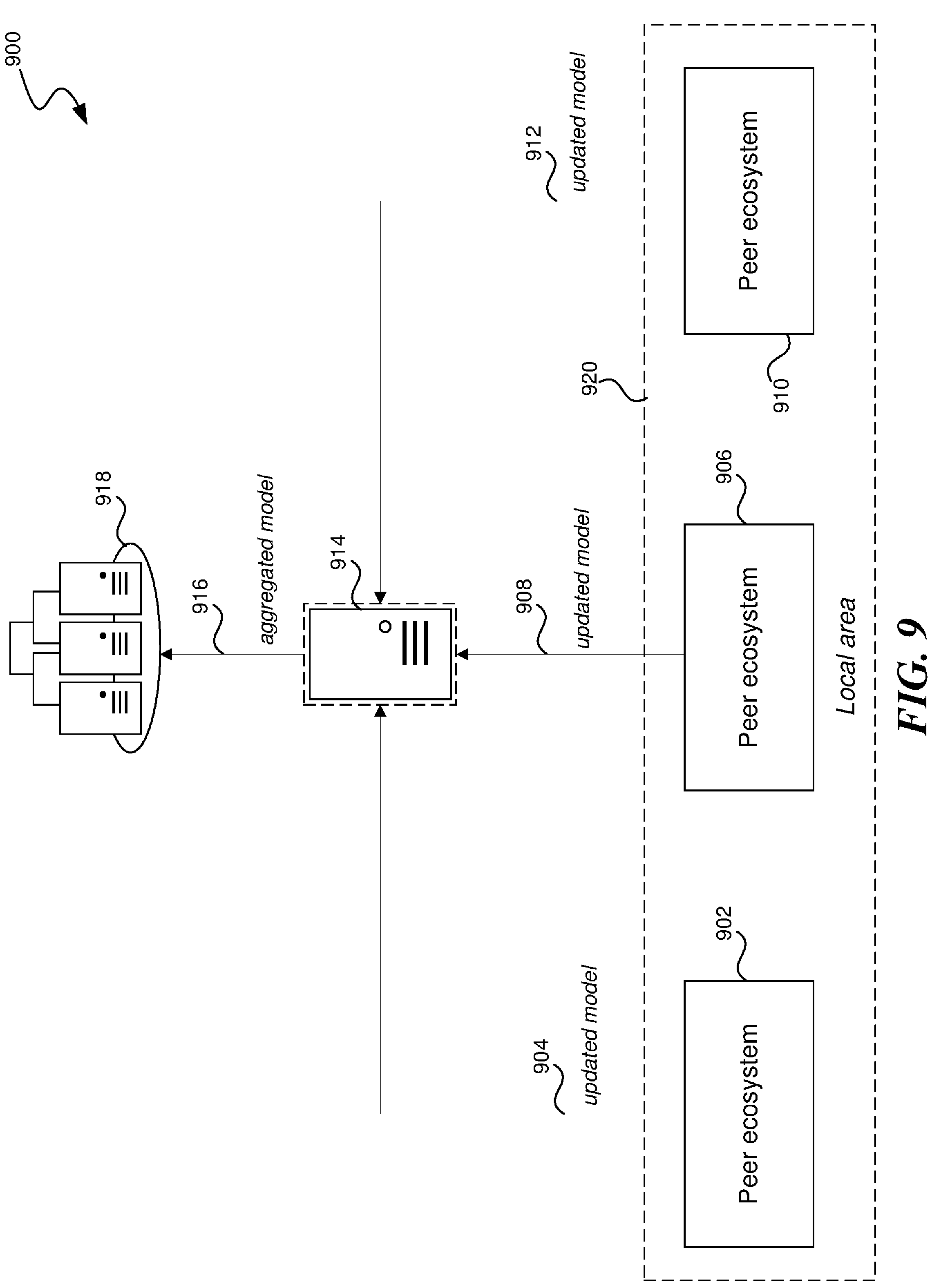
FIG. 9 is a block diagram illustrating a system in which a federated learning tower aggregates updated models from multiple peer ecosystems within a local area for transmission to a central computing system.

FIG. 9 is a block diagram illustrating a system 900 in which a federated learning tower 914 aggregates updated models 904, 908, 912 from multiple peer ecosystems 902, 906, 910 within a local area 920 for transmission to a central computing system 918. In some implementations, peer ecosystems 902, 906, 910 can be within a threshold distance of each other and/or of federated learning tower 914, such that federated learning tower 914 can aggregate updated models 904, 908, 912 for a given location. Peer ecosystems 902, 906, 910 can each receive instances of a global machine learning model from central computing system 918, and update those instances based on data collected from their respective endpoint devices, as described herein with respect to FIG. 6 and FIG. 8. For example, in some implementations, peer ecosystems 902, 906, 910 can be similar to peer ecosystem 626 of FIG. 6 and/or peer ecosystem 826 of FIG. 8.

Peer ecosystems 902, 906, 910 can transmit updated models 904, 908, 912 to federated learning tower 914, which can act as a middleman between peer ecosystems 902, 906, 910 and central computing system 918. Peer ecosystems 902, 906, 910 can transmit updated models 904, 908, 912 to federated learning tower 914 via any suitable network, such as network 230 of FIG. 2, which can be a local area network, WiFi, a mesh network, a cellular network, etc. Although described herein as updated models 904, 908, 912, it is contemplated that peer ecosystems 902, 906, 910 can alternatively or additionally transmit parameters of updated models 904, 908, 912 to federated learning tower 914.

Federated learning tower 914 can aggregate updated models 904, 908, 912 e.g., adjust the parameters (e.g., weights) at nodes of the global model provided by central computing system 918 to reflect parameters adjusted by each of peer ecosystems 902, 906, 910. Federated learning tower 914 can then provide an aggregated model 916 to central computing system 918. In some implementations, central computing system 918 can aggregate multiple updated models from multiple federated learning towers in order to update and/or refine the global model, without being exposed to the actual data collected by peer ecosystems 902, 906, 910. In addition, by using federated learning tower 914 as a middleman for aggregating updated models 904, 908, 912, aggregated model 916 can be further anonymized from the collected data, which can in some instances still be indicative of actions and/or behaviors of users of endpoint devices within peer ecosystems 902, 906, 910.

Figure 10:
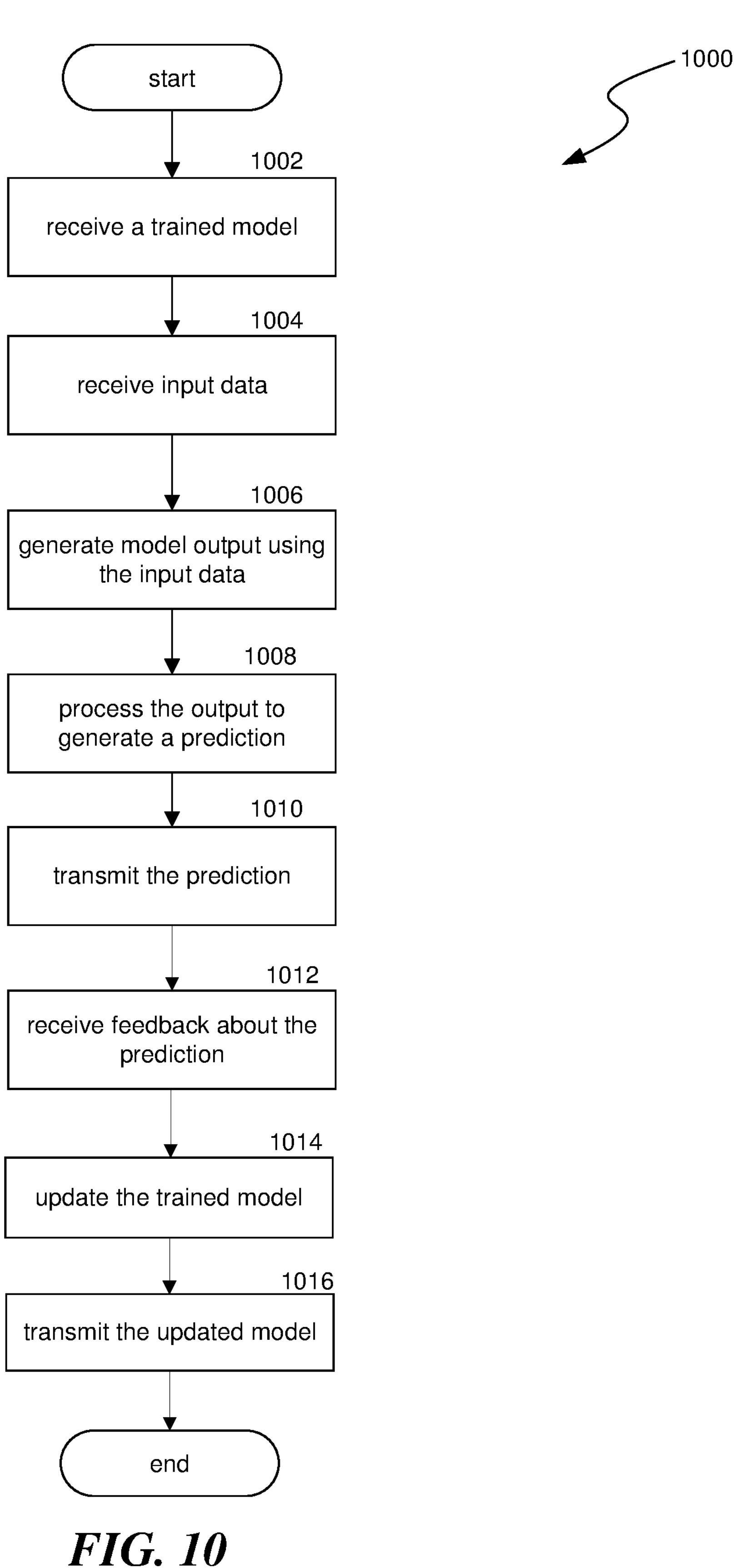
FIG. 10 is a flow diagram illustrating a process used in some implementations for locally applying and updating a trained model according to some implementations of the present technology.

FIG. 10 is a flow diagram illustrating a process 1000 used in some implementations for locally applying and updating a trained model according to some implementations of the present technology. In some implementations, process 1000 can be performed as a response to receipt of a trained model, e.g., a global machine learning model and/or updated machine learning model, as described further herein. In some implementations, some or all of process 1000 can be performed by a locally networked endpoint device. In some implementations, some or all of process 1000 can be performed by a locally networked central device.

At block 1002, process 1000 can receive a trained model (e.g., a global machine learning model and/or an updated machine learning model, as described herein). In some implementations, the received model can be initially trained by a central computing system using machine learning models and/or parameters for machine learning models that are generated and/or revised by endpoint device peer ecosystems, such as households, offices, business, or other locations having locally networked endpoint devices (e.g., smart devices, IoT devices, computing devices, mobile devices, etc.). In some implementations, the central computing system can train the initial model on actual datasets received from endpoint devices and/or endpoint device peer ecosystems. For example, the central computing system can map the features of the datasets and/or the parameters of received machine learning models into a classification space identifying known actions (or inactions) made with respect to particular types of endpoint devices. In some implementations, process 1000 can receive an updated machine learning model, as when process 1000 is performed iteratively.

At block 1004, process 1000 can receive input data. In some implementations, the input data can be data collected from one or more locally networked endpoint devices within an endpoint device peer ecosystem. The input data can include, for example, user data (e.g., data specific to a user of a locally networked endpoint device, such as who accessed the locally networked endpoint device, demographics of the user, habits of the user, etc.), usage data (e.g., when and how the locally networked endpoint device was used), peer ecosystem data (e.g., demographics data for the ecosystem, e.g., a household, such as location of the household, how many people are in the household, demographics of the household, etc.), environmental data (e.g., data collected from sensors, such as ambient light level, noise level, temperature, etc.), and/or the like. In some implementations, process 1000 can further receive and/or obtain contextual factors surrounding usage of the locally networked endpoint devices, such as time of the day, time of the year, season, weather, where the endpoint device was used, other actions being taken when the endpoint device was being used, etc.

At block 1006, process 1000 can generate a model output using the input data and the trained model. In some implementations, process 1000 can further generate the model output using any contextual factors. In some implementations, based on the input data, process 1000 can extract relevant features from the input data and map the features as data points to an output vector in the classification space created using the training data.

At block 1008, process 1000 can process the model output to generate a predicted action to take and/or that will be taken by a locally networked input device based on the input data. In some implementations, process 1000 can generate a match score between the output (i.e., the mapped features of the input data) and the features of candidate actions in the classification space by calculating a distance between the output and the candidate actions. The match score can be any numerical or textual value or indicator, such as a statistic or percentage. Process 1000 can identify the predicted action based on, for example, the candidate action having the highest match score to the output.

At block 1010, process 1000 can transmit the prediction. In some implementations, process 1000 can output the predicted action by causing a locally networked endpoint device to perform the predicted action. In some implementations, process 1000 can output the predicted action by audibly announcing the predicted action (e.g., a virtual assistant on a smart speaker asking, "It's 9:00 AM, do you want the smart coffee maker to start making your coffee?"). In some implementations, process 1000 can output the predicted action by visually displaying the predicted action (e.g., a smart television displaying a prompt to change the channel to view the user's most frequently watched show).

At block 1012, process 1000 can receive feedback about the predicted action. In some implementations, the feedback can be explicit, e.g., the user selects to perform a suggested action, the user declines to perform the suggested action, the user audibly confirms that the predicted action is correct, the user audibly announces the predicted action is incorrect and/or identifies the correct action, the user selects a virtual or physical button indicating that the predicted action is correct or incorrect, etc. In some implementations, the feedback can be implicit, e.g., the user does not correct implementation of the predicted action. The user can provide feedback by the same or a different endpoint device by which the predicted action was output.

At block 1014, process 1000 can update the trained model. For example, process 1000 can use the feedback data to identify whether the predicted action was correct or incorrect (and if incorrect, what the correct action or inaction was, e.g., by observing the user's behavior with respect to the endpoint device after the action was predicted), and use that information as a comparison factor to update the model and/or the classification space. In some implementations, process 1000 can weigh the current training data more heavily than the initial or past training data, as the later training data can be considered more relevant and/or accurate. Although illustrated as a single process 1000 in FIG. 10, it is contemplated that process 1000 can be performed multiple times and/or repeatedly, either consecutively or concurrently, as additional input data is received.

At block 1016, process 1000 can transmit the trained model. In some implementations, process 1000 can transmit the trained model to the central computing system from which the trained model was received at block 1002. In some implementations, process 1000 can transmit the trained model to the central computing system via a locally networked endpoint device, such as a locally networked central device. Process 1000 can transmit the trained model via any suitable network, such as network 230 of FIG. 2, which can be the same or a different network from which process 1000 received the trained model at block 1002.

Some implementations of the endpoint device peer ecosystem can include a machine learning component, such as a neural network, that is trained using a variety of data, including known input data, known actions, past actions taken by the user or similar users, user data, contextual factors, and whether the user identified a predicted action as correct or incorrect. Some implementations can feed input data including user data, usage data, environmental factors, etc., and any contextual factors into the trained machine learning component, and based on the output, can generate a predicted action. Some implementations provide this predicted action to a user via a display, an audible announcement, and/or by causing an endpoint device to perform the action automatically. Some implementations receive feedback about the predicted action to further enhance the trained model.

A "machine learning model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the trained model can be a neural network with multiple input nodes that receive input data including user data, usage data, environmental data, etc., and any contextual factors. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained, can be used to predict an action to take with respect to an endpoint device. In some implementations, such neural networks, known as deep neural networks, can have multiple layers of intermediate nodes with different configurations, can be a combination of models that receive different parts of the input and/or input from other parts of the deep neural network, or are convolutions or recurrent—partially using output from previous iterations of applying the model as further input to produce results for the current input.

A machine learning model can be trained with supervised learning, where the training data includes known input data, known actions, and any contextual factors as input and a desired output, such as a prediction of an action. Current input data collected by one or more locally networked endpoint devices can be provided to the model. Output from the model can be compared to the desired output for that input data, and, based on the comparison, the model can be modified, such as by changing weights between nodes of the neural network or parameters of the functions used at each node in the neural network (e.g., applying a loss function). After applying each of the factors in the training data and modifying the model in this manner, the model can be trained to evaluate new input data.

Some implementations of the endpoint device peer ecosystem can include a deep learning component. A "deep learning model," as used herein, refers to a construct trained to learn by example to perform classification directly from input data. The deep learning model is trained by using a large set of labeled data and applying a neural network as described above that includes many layers. The deep learning model in some implementations can be a convolutional neural network (CNN) that is used to automatically learn input data's inherent features to identify a predicted action. For example, the deep learning model can be an R-CNN, Fast R-CNN, or Faster-RCNN.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for providing an endpoint device peer ecosystem for federated learning, the method comprising:

receiving a global machine learning model from a central computing system, the global machine learning model being trained on parameters aggregated from multiple endpoint devices, wherein the parameters are generated based on one or more local datasets collected by respective endpoint devices of the multiple endpoint devices;

aggregating first data collected by two or more locally networked endpoint devices within a first endpoint device peer ecosystem, wherein the first endpoint device peer ecosystem is a first local network of multiple collocated and/or interconnected first endpoint devices including the two or more locally networked endpoint devices;

generating a first retrained instance of the global machine learning model, wherein generating the first retrained instance of the global machine learning model includes updating the parameters based on the aggregated first data; and transmitting first updated model data, the first updated model data including at least one of A) the first retrained instance of the global machine learning model, B) the updated parameters based on the aggregated first data, or C) both, to the central computing system, wherein the central computing system:

obtains second updated model data from a second endpoint device peer ecosystem, wherein the second endpoint device peer ecosystem is a second local network of multiple collocated and/or interconnected second endpoint devices, and wherein the second updated model data includes at least one of I) a second retrained instance of the global machine learning model, II) adjusted parameters of the global machine learning model based on aggregated second data collected by two or more of the multiple collocated and/or interconnected second endpoint devices, or III) both;

determines that the second endpoint device peer ecosystem is within a threshold geographic distance of the first endpoint device peer ecosystem;

based on the determining that the second endpoint device peer ecosystem is within the threshold geographic distance of the first endpoint device peer ecosystem, aggregates the first updated model data and the second updated model data; and updates the global machine learning model based on the aggregated first updated model data and second updated model data.

2. The method of claim 1, wherein the first updated model data does not include the aggregated first data received from the two or more locally networked endpoint devices.

3. The method of claim 1, wherein the two or more locally networked endpoint devices include two or more of an Internet-of-Things device, a vehicle, a computing device, a mobile device, a wearable device, a smart device, a sensor, a gaming system, a television, a speaker, a WiFi router, or any combination thereof.

4. The method of claim 1, wherein the two or more locally networked endpoint devices communicate via at least one of Bluetooth, near field communication, a mesh network, WiFi, cellular network, or any combination thereof.

5. The method of claim 1, wherein the retrained instance of the global machine learning model is used to personalize services provided by the two or more locally networked endpoint devices.

6. The method of claim 1, wherein another locally networked endpoint device within the first endpoint device peer ecosystem aggregates the first data from the two or more locally networked endpoint devices.

7. The method of claim 6, wherein the other locally networked endpoint device is a computing system, a mobile phone, an Internet-of-Things hub, a WiFi router, a gaming system, or a smart television.

8. The method of claim 6, wherein the other locally networked endpoint device is selected to aggregate the first data from the two or more locally networked endpoint devices based on at least one of local storage, memory, processing speed, power status, latency, or any combination thereof.

9. The method of claim 1, wherein the first updated model data is transmitted to the central computing system via a federated learning tower.

10. The method of claim 9, wherein the multiple collocated and/or interconnected second endpoint devices are outside of the first endpoint device peer ecosystem.

11. A computer-readable storage medium storing instructions that, when executed by a computing system, cause the computing system to perform a process for providing an endpoint device peer ecosystem for federated learning, the process comprising:

receiving a global machine learning model from a central computing system, the global machine learning model being trained on parameters aggregated from multiple endpoint devices, wherein the parameters are generated based on one or more local datasets collected by respective endpoint devices of the multiple endpoint devices;

aggregating first data collected by two or more locally networked endpoint devices within a first endpoint device peer ecosystem, wherein the first endpoint device peer ecosystem is a first local network of multiple collocated and/or interconnected first endpoint devices including the two or more locally networked endpoint devices;

generating a first retrained instance of the global machine learning model, wherein generating the first retrained instance of the global machine learning model includes updating the parameters based on the aggregated first data; and transmitting first updated model data, the first updated model data including at least one of A) the first retrained instance of the global machine learning model, B) the updated parameters based on the aggregated first data, or C) both, to the central computing system, wherein the central computing system;

obtains second updated model data from a second endpoint device peer ecosystem, wherein the second endpoint device peer ecosystem is a second local network of multiple collocated and/or interconnected second endpoint devices, and wherein the second updated model data includes at least one of I) a second retrained instance of the global machine learning model, II) adjusted parameters of the global machine learning model based on aggregated second data collected by two or more of the multiple collocated and/or interconnected second endpoint devices, or III) both;

determines that the second endpoint device peer ecosystem is within a threshold geographic distance of the first endpoint device peer ecosystem;

based on the determining that the second endpoint device peer ecosystem is within the threshold geographic distance of the first endpoint device peer ecosystem, aggregates the first updated model data and the second updated model data; and updates the global machine learning model based on the aggregated first updated model data and second updated model data.

12. The computer-readable storage medium of claim 11, wherein the first updated model data does not include the aggregated first data received from the two or more locally networked endpoint devices.

13. The computer-readable storage medium of claim 11, wherein another locally networked endpoint device within the first endpoint device peer ecosystem aggregates the first data from the two or more locally networked endpoint devices.

14. The computer-readable storage medium of claim 13, wherein the other locally networked endpoint device is a computing system, a mobile phone, an Internet-of-Things hub, a WiFi router, a gaming system, or a smart television.

15. The computer-readable storage medium of claim 13, wherein the other locally networked endpoint device is selected to aggregate the first data from the two or more locally networked endpoint devices based on at least one of local storage, memory, processing speed, power status, latency, or any combination thereof.

16. A computing system for providing an endpoint device peer ecosystem for federated learning, the computing system comprising:

one or more processors; and one or more memories storing instructions that, when executed by the one or more processors, cause the computing system to perform a process comprising:

receiving a global machine learning model from a central computing system, the global machine learning model being trained on parameters aggregated from multiple endpoint devices, wherein the parameters are generated based on one or more local datasets collected by respective endpoint devices of the multiple endpoint devices;

aggregating first data collected by two or more locally networked endpoint devices within a first endpoint device peer ecosystem, wherein the first endpoint device peer ecosystem is a first local network of multiple collocated and/or interconnected first endpoint devices including the two or more locally networked endpoint devices;

generating a first retrained instance of the global machine learning model, wherein generating the first retrained instance of the global machine learning model includes updating the parameters based on the aggregated first data; and transmitting first updated model data, the first updated model data including at least one of A) the first retrained instance of the global machine learning model, B) the updated parameters based on the aggregated first data, or C) both, to the central computing system, wherein the central computing system;

obtains second updated model data from a second endpoint device peer ecosystem, wherein the second endpoint device peer ecosystem is a second local network of multiple collocated and/or interconnected second endpoint devices, and wherein the second updated model data includes at least one of I) a second retrained instance of the global machine learning model, II) adjusted parameters of the global machine learning model based on aggregated second data collected by two or more of the multiple collocated and/or interconnected second endpoint devices, or Ill) both;

determines that the second endpoint device peer ecosystem is within a threshold geographic distance of the first endpoint device peer ecosystem;

based on the determining that the second endpoint device peer ecosystem is within the threshold geographic distance of the first endpoint device peer ecosystem, aggregates the first updated model data and the second updated model data; and updates the global machine learning model based on the aggregated first updated model data and second updated model data.

17. The computing system of claim 16, wherein the two or more locally networked endpoint devices communicate via at least one of Bluetooth, near field communication, a mesh network, WiFi, cellular network, or any combination thereof.

18. The computing system of claim 16, wherein the retrained instance of the global machine learning model is used to personalize services provided by the two or more locally networked endpoint devices.

19. The computing system of claim 16, wherein the first updated model data is transmitted to the central computing system via a federated learning tower.

20. The computing system of claim 19, wherein the multiple collocated and/or interconnected second endpoint devices are outside of the first endpoint device peer ecosystem.

* * * * *